United States Patent
Jagpal et al.

(10) Patent No.: US 9,219,719 B1
(45) Date of Patent: Dec. 22, 2015

(54) AUTOMATIC DYNAMIC VETTING OF BROWSER EXTENSIONS AND WEB APPLICATIONS

(71) Applicant: Google Inc., Mountain View, CA (US)

(72) Inventors: Navdeep Singh Jagpal, Montreal (CA); Eric Dingle, Montreal (CA); Christian Caron, Brossard (CA)

(73) Assignee: Google Inc., Mountain View, CA (US)

( * ) Notice: Subject to any disclaimer, the term of this patent is extended or adjusted under 35 U.S.C. 154(b) by 206 days.

(21) Appl. No.: 13/624,120

(22) Filed: Sep. 21, 2012

(51) Int. Cl.
*G06F 11/00* (2006.01)
*H04L 29/06* (2006.01)
*G06F 21/62* (2013.01)

(52) U.S. Cl.
CPC .......... *H04L 63/062* (2013.01); *G06F 21/6209* (2013.01); *G06F 21/6218* (2013.01)

(58) Field of Classification Search
CPC ...... G06F 21/60; G06F 21/577; G06F 21/562
USPC .............. 713/150, 181, 187; 726/1, 3, 5
See application file for complete search history.

(56) References Cited

U.S. PATENT DOCUMENTS

| | | | |
|---|---|---|---|
| 7,549,144 B2 * | 6/2009 | Jubran | 717/143 |
| 8,156,566 B2 * | 4/2012 | Lim | 726/30 |
| 2006/0136750 A1 * | 6/2006 | Jakubowski et al. | 713/193 |
| 2009/0222907 A1 * | 9/2009 | Guichard | 726/17 |

OTHER PUBLICATIONS

"Digital Goods and the New Economy"—Danny Quah, London School of Economics and Political Science, Mar. 2003 http://eprints.lse.ac.uk/2236/1/Digital_Goods_and_the_New_Economy.pdf.*

* cited by examiner

*Primary Examiner* — Randy Scott
(74) *Attorney, Agent, or Firm* — Brake Hughes Bellermann LLP

(57) ABSTRACT

A digital good offered for downloading from a first computing system to a client computing device for execution by a browser executing on the client is identified. The digital good is received at a third computing system, where source code for the received digital good includes scripting language code. The code is re-written to include tracking code to track behavior of the digital good during execution of the digital good, and the re-written digital good is executed in a browser run by the third computing system. Based on evaluation of results of executing the re-written digital good, it is automatically determined, by the third computer system, whether the digital good violates one or more predetermined conditions, and based on the determination of whether the digital good violates a predetermined conditions, it is automatically determined whether to discourage downloading the digital good to, or executing the digital good by, the client.

23 Claims, 6 Drawing Sheets

AUTOMATIC DYNAMIC VETTING OF BROWSER EXTENSIONS AND WEB APPLICATIONS

TECHNICAL FIELD

This disclosure relates testing web extensions and applications, in particular, to automatic dynamic vetting of web extension and applications.

BACKGROUND

Digital goods, such as installable software applications, including web applications and browser extensions can be offered to users. The digital goods can be offered within in a designated online marketplace for web applications and extensions, and they can be offer from other online locations other than the designated online marketplace. When digital goods are offered for sale or for free download in a marketplace the goods can be listed in the marketplace by a developer of the goods, and the marketplace can offer a forum to the developer within which many users can discover the developer's goods. In addition, the marketplace can collect payment for the goods from purchasers of the goods and then can pass on the payment to the developer of the digital goods.

A store operating as a marketplace has many desirable properties compared to a store operating as a seller of record or as a reseller, in which the reseller purchases goods from developers and resells them at a price determined by the reseller. A marketplace operator may have less liability for the performance of the goods that are sold and has the opportunity to be more inclusive of goods that can be offered in the marketplace. However, the marketplace operator may nevertheless want to ensure that the digital goods conform to certain quality standards and did not pose a threat to the consumers of the goods. On the other hand, the marketplace operator may want to make the process of listing a good in the marketplace as easy as possible for a developer of the good.

In addition, a party that has a stake in the performance, security, reliability of the web applications and browser extensions, including a host of an online marketplace for the web applications and browser extensions, generally may want to ensure that users of the web applications and browser extensions use high performance, secure, and reliable web applications and browser extensions, or at least that users are aware of any concerns regarding the performance, security, and reliability of web applications and browser extensions that they use. Furthermore, the marketplace operator and other parties that have stakes in the performance, security, reliability of the web applications and browser extensions also may want to ensure that web applications and browser extensions that are offered to users from locations outside of the marketplace are equally high performance, secure, and reliable web applications and browser extensions, or at least that users are aware of any concerns regarding the performance, security, and reliability of web applications and browser extensions provided from outside the marketplace.

SUMMARY

In a general aspect, a computer-implemented method includes identifying a digital good that is offered for downloading from a first computing system to a client computing device for execution by a browser executing on the client computing device and receiving the identified digital good at a third computing system, where source code for the received digital good includes scripting language code. The source code of the received digital good is re-written to include tracking code to track behavior of the received digital good during execution of the re-written digital good, and the re-written digital good is executed in a browser run by one or more processors of the third computing system. Based on evaluation of results of executing the re-written digital good, it is automatically determined, by one or more processors of the third computer system, whether the digital good violates one or more predetermined conditions, and based on the determination of whether the digital good violates one or more of the predetermined conditions, it is automatically determined whether to discourage downloading the digital good to the client computing device or executing the digital good by the client computing device.

In another general aspect, an apparatus includes one or more memory devices arranged and configured to store executable code and one or more processors operably coupled to the one or more memory devices, where the processors are arranged and configured to execute the code such that the apparatus performs the following actions: identifying a digital good that is offered for downloading from a first computing system to a client computing device for execution by a browser executing on the client computing device; receiving the identified digital good at a third computing system, wherein source code for the received digital good includes scripting language code; re-writing the source code of the received digital good to include tracking code to track behavior of the received digital good during execution of the re-written digital good; executing the re-written digital good in a browser run by one or more processors of the third computing system; automatically determining, by one or more processors of the third computer system, based on evaluation of results of executing the re-written digital good whether the digital good violates one or more predetermined conditions; and based on the determination of whether the digital good violates one or more of the predetermined conditions, automatically determining whether to discourage downloading the digital good to the client computing device or executing the digital good by the client computing device.

Implementations can include one or more of the following features. For example, the scripting language code can include JavaScript code. The digital good can include a web application. The digital good can include a browser extension.

Identifying the digital good can includes crawling content of a webpage accessible to the client computing device through a network, and identifying the digital good as part of the content of the webpage. Identifying the digital good can include crawling content of a webpage accessible to the client computing device through a network, identifying a program binary file as part of the content of the webpage, and identifying the digital good as part of the content of the program binary file. Identifying the digital good can include receiving an indication from a number of client devices that a digital good having a unique identification code has been downloaded to a client device from a webpage, where the number exceeds a threshold number, and identifying the digital good on the webpage.

Discouraging downloading the digital good to the client computing device or executing the digital good by the client computing device can include downloading to the client computing device a blacklist that includes the digital good, where the blacklist instructs the client computing device to disable the digital good from execution by the browser. Discouraging downloading the digital good to the client computing device or executing the digital good by the client computing device can include receiving an indication from the client computing device that the digital good is proposed from downloading to, or execution by, the client computing device, and sending a warning to the client computing device based on the determination of whether the digital good violates one or more of the predetermined conditions.

Re-writing the code of the received digital good can include re-writing the code such that symbolic information is propagated during execution of the re-written digital good so that particular inputs to the code that exercise particular control paths in the code are identified. Executing the re-written digital good can include interpreting code of the re-written digital good with a scripting language interpreter that is also used to interpret the received digital good during execution of the received digital good. An identified input to the code that exercises a particular control path can include a uniform resource locator. An identified input to the code that exercises a particular control path can include input received from a user of the digital good.

A tainted variable in the code can be identified, and re-writing the code of the received digital good can include re-writing the code to include information to track a flow of the tainted variable during execution of the re-written code. A code operation of the re-written digital good that is associated with the tainted variable and that leaks information associated with the tainted variable from a client computing device running the digital good across a network to a second computing device can be identified.

Automatically determining, based on evaluation of results of executing the re-written digital good whether the digital good violates one or more predetermined conditions can include determining whether personal user information associated with the tainted variable is leaked from a client computing device running the digital good across a network to a second computing device.

DETAILED DESCRIPTION

Figure 1:
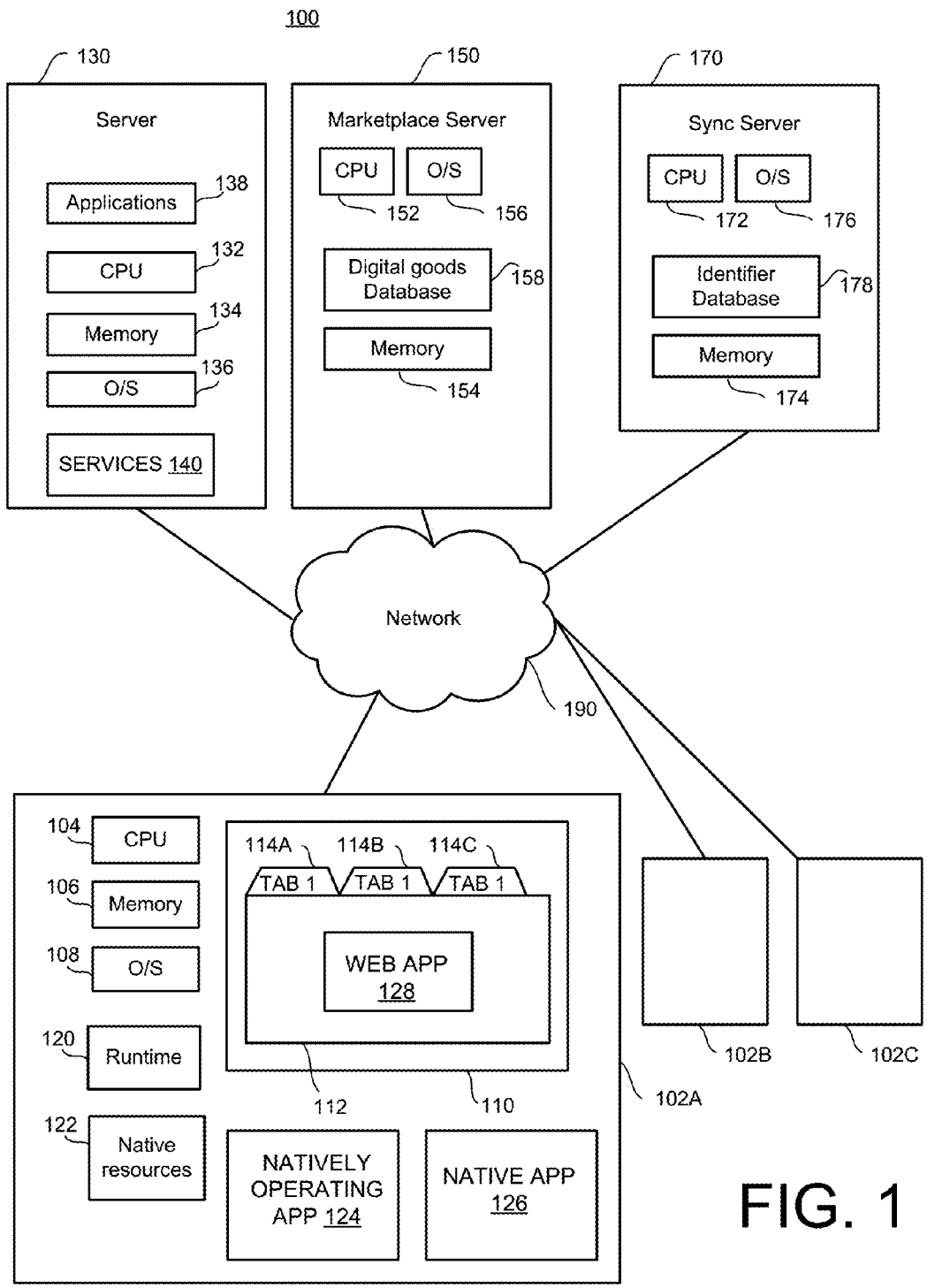
FIG. 1 is a schematic diagram of a system that may provide automatic dynamic vetting of browser extensions and web applications.

FIG. 1 is a schematic block diagram of an example embodiment of a system 100 that may provide automatic dynamic vetting of browser extensions and web applications. In various implementations, the system 100 may include client computing devices 102A, 102B, 102C (such as desktop computers, notebook computers, netbook computers, tablet computers, smart-phones, etc.). A client computing device 102A can include one or more processors (CPU) 104 and one or more memories 106. The client computing device 102A can execute an operating system (O/S) 108 and various applications (110, 124, and 126) which may display a user interface window (e.g., web browser 112). The client computing device 102A can include a natively operating application 124 as well as one or more native applications 126. Application 110 is another example of a native application, and the user interview window of application 110 is a web browser. Other examples of native applications 126 include word processing applications, image editing applications, email applications, media players, calculators, etc.

In various implementations, the web browser 112 may include or execute one or more web applications 128. In this context, a "web application" may be configured to perform a single task or multiple tasks for a user. In such an implementation, the web application may be configured to be executed or interpreted by the web browser. This is compared with the native applications (e.g., native application 126) that include machine executable code and are configured to be executed directly by a processor or via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a native application 126. Examples of web applications include games, photo editors, video players, etc. that are run inside the web browser 112.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various implementations, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the websites being viewed in it. For example, web extensions can extend the functionality of the browser by adding a new button to the address bar, such as an ever-present currency converter. Buttons like this can also apply to the current website being viewed. For example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page. Compared to web applications, extensions cut across websites and web applications. Extensions are usually in effect across all websites (though some are site-specific).

Web applications do not combine with other applications in this way. Rather, web applications run standalone, like any regular website. Web browser extensions and applications can be downloaded for installation in and execution by a browser running on a client computing device.

In one implementation, the client computing device 102A may be running, or causing the operating system 108 to execute, application 110 or web browser 112. In various implementations, this web browser 112 may include a plurality of panes or tabs 114A, 114B, 114C. The web browser 112 can be a visual area, usually rectangular, containing some kind of user interface. In a graphical user interface (GUI) used in the client device 102A, the web browser 112 can be a two-dimensional object arranged on a plane of the GUI known as the desktop. The web browser 112 can include other graphical objects that may be called the "chrome" of the web browser, e.g., a menu-bar, toolbars, controls, icons. The web browser may also include a working area in which a document, image, folder contents, or other main object (e.g., web application 128) can be displayed. The working area may be capable of holding only one main object (i.e., in a single document interface) or more than one main object in a multiple document interface. In some applications, specifically web browsers, multiple documents can be displayed in individual tabs 114A, 114B, 114C. These tabs 114A, 114B, 114C are typically displayed one at a time, and are selectable via a tab-bar which often resides above the contents of an individual window. That is, one selected tab 114A is "forward-facing" and displays information or content to a user in the web browser 112, with the content of other tabs 114B, 114C is "hidden." The tabs 114A, 114B, and 114C may execute in separate processes, each with its own individual memory.

The web applications 128 and browser extensions executed by the browser 112 can include code written in a scripting language, such as, JavaScript, VBScript, ActionScript, or other scripting languages.

A "natively operating application" 124 is an application that is coded using only web technology (defined here as code that can be implemented directly by a web browser), such as HTML, JAVASCRIPT, ACTIONSCRIPT, or CSS. Natively operating application 124 may be downloaded from a marketplace server 150 via a web browser, such as web browser 112, and may be installed on client computing device 102A. The natively operating application 124 may operate using runtime 120. The natively operating application 124 may be configured to be executed directly by a processor 104 or via the operating system 108 of the client device, using runtime 120, for example. Because natively operating application 124 is coded with web technologies, no compilation step is required. Instead, natively operating application 124 may simply be packaged (e.g., in a .CRX format, or zipped, for example with some signature or verification) and provided to client computing device 102A, for example via web browser 112 from a digital marketplace such as marketplace server 150, as described in more detail below. The runtime 120 may accept the natively operating application 124 as a packaged file (e.g., .CRX files) and then execute the natively operating application 124.

Runtime 120 uses a multiprocess architecture. Thus, if one natively operating application 124 crashes, a user will not lose other natively operating applications running via runtime 120. Each application operates as a new process on the single runtime.

Runtime 120 may also be downloaded from a marketplace server 150 (or another server) via a web browser, such as web browser 112, and may be installed on client computing device 102A. In some implementations, runtime 120 may already be installed on client computing device 102A when natively operating application 124 is installed. In other implementations, runtime 120 may be bundled with a single download with natively operating application 124, and/or downloaded or installed prior to installation of natively operating application 124.

Natively operating application 124 may, via runtime 120, access a network 190, and may also access one or more native resources 122 of a client computer. Native resources 122 may include any kind of resource included in or locally connected to computing device 102A. For example, native resources 122 may include native windows (e.g., any windows outside a web browser tab), a graphics processing unit (GPU), a web camera, a microphone, a printer, a file system including documents, images, other media, or other resources. Natively operating application 124 may be coded with web technologies, similar to web applications (which are described in more detail below), but in contrast to web applications, natively operating application 124 may access native resources 122 of client computing device 102.

Additionally, natively operating application 124 may access various remote services 140 that may be accessible via remote servers. For example, as shown in FIG. 1, the system 100 can include a server 130 that includes one or more processors 132, one or more memories 134, an operating system 136, applications 138, and services 140. Services 140 may be available via server 130, for example, and services 140 may include data uploading or storage services, for example to allow a user to upload photos from client computing device 102A for storage on a remote server 130. For example, in one implementation, natively operating application 124 may automatically access photos stored in a portion of memory 106, without requiring additional input from a user (with a user's prior permission). Natively operating application 124 may automatically filter the photos from other files (e.g., based on a file type, file name, file size, or other criteria), and may also automatically upload the photos (with a user's permission) to an account associated with the user via services 140 of developer server 130, using network 190.

Other shared data services 140 may also be available, for example to provide access to a media gallery, music, or documents. A music related application, for example, may access only a portion of a file system containing music, so that the application can do something with the music such as sync the music with a user account. Using an API, for example, a natively operating application 124 can request access to all music on device 102A. The API may determine what music is stored on device 102A, and the application may get the music and sync it to a remote server (e.g., 130).

The client computing device 102A can communicate with a digital goods marketplace server 150 that provides a marketplace for digital goods (i.e., web applications, natively operating applications, and/or browser extensions) to client computing devices 102A, 102B, 102C. The marketplace server 150 can include one or more processors 152 and one or more memories 154. The marketplace server 150 can execute an operating system 156 and various applications and services to provide functionality to the client computing devices. For example, in one implementation, the marketplace server 150 can include a repository for database of digital goods 158, and the digital goods can be served from, or downloaded from, the repository to the client computing devices. In another implementation, the digital goods can be stored in, and served to client computing devices from, a repository that is remotely located from the marketplace server. For example, digital goods could be stored and served to client computing devices from individual repositories that are operated and controlled by developers of the digital goods, and digital goods repository 158 of the marketplace server 150 can provide just a reference to the individual repositories that are operated by the developers.

As shown in FIG. 1, the system 100 can also include a sync server 170 that includes one or more processors 172, one or more memories 174, an operating system 176, and an identifier database 178. The identifier database 178 can store unique identifiers to enable syncing between various user sessions on different client computing devices (e.g., devices 102A, 102B, 102C).

For example, in some implementations, a user account allows a user to authenticate to system services (e.g., web applications) and receive authorization to access them. To log in to a user account, a user may authenticate herself with a password or other credentials for the purposes of accounting, security, and resource management, for example. Once the user has logged on (e.g., to a web browser, to a computing device, etc.) an operating system may use an identifier such as an integer to refer to the user, rather than a username. For example, the username may be correlated with a user identifier. A system (e.g., server 170) may reconcile and validate the proper ownership of user accounts, and can permanently link ownership of those user accounts to particular individuals by assigning a unique identifier to validated account login identifiers (e.g., user names and passwords, secure identifiers, etc.). The system may validate that individuals only have account login identifiers for the appropriate systems and applications, for example according to an organization's business policies, access control policies, and various application requirements.

In some implementations, for example, when a user signs into a web browser 112 or a certain device 102A, all of the user's bookmarks, extensions, web applications, natively operating applications, theme, and other browser preferences may be saved (e.g., in memory 174) and synced to a user's account (e.g., using identifier database 178). The user can then load these settings anytime the user signs into the web browser 112 on other computers and devices (e.g., devices 102B or 102C). Changes to browser settings, for example, may be synced instantaneously to the account, and may be automatically reflected on other computers where the user has signed in (and enabled syncing).

When a packaged web application or natively operating application 124 has been installed, computing device 102A may locally store some data related to the application. A server (e.g., sync server 170) may ensure that local data from computing device 102A is synced across all of a user's devices or all devices that are used to log the user into a user account. Additionally, passwords traditionally are stored locally, but can be synced across devices using the server. Further, the server may sync across different devices all installed natively operating applications, web applications, browser extensions, browser bookmarks, settings, profiles, browser history, themes, plugins, local permissions, mode indicators, and data associated with the web applications and browser extensions for a user. For example, if a user of computing device 102A accesses a user account (for example, via a web browser) from computing device 102C, server 150 may copy settings and data associated with web applications and browser extensions (for example, that the user has selected to sync) from the user account to computing device 102C. Further, the server may be capable of device-sensitive sync. For example, certain versions of web applications with powerful graphics may be suitable for a desktop computer with a hardware accelerator and large display monitor, but not as suitable for a web-enabled phone, tablet, or laptop. The server may determine that a version of the web application is not as suitable for a user's web-enabled phone, tablet, or laptop, and may notify the user (e.g., during a sync or login process), or exclude a version or a web application from syncing on the user's web-enabled phone, tablet, or laptop.

Changes to settings on one computing device may be automatically copied (e.g., via server 170) from other computers (for example, if the user has enabled that sync feature). Synced data may be encrypted when it travels between computing devices 102A, 102B, 102C, and server 150 to keep information secure. Further, passwords may be encrypted on computing devices 102A, 102B, 102C, and server 150 using a cryptographic key.

Figure 2:
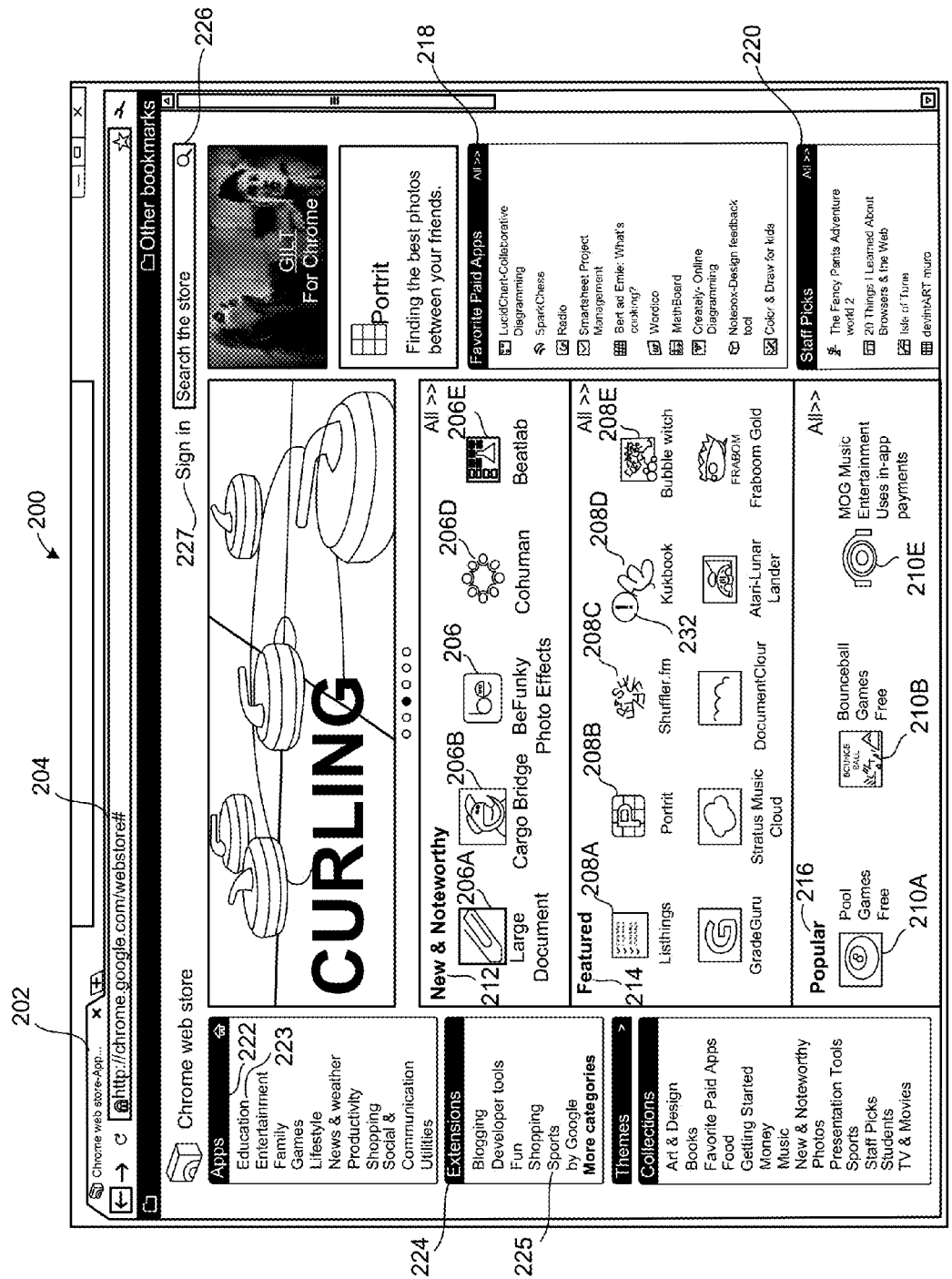
FIG. 2 is a screenshot of the user interface to a marketplace of digital goods.

FIG. 2 is a screenshot of a user interface 200 to a marketplace 150 of digital goods. As used herein "digital goods" refers to web applications, natively operating applications, and/or browser extensions. The user interface 200 can be displayed by a browser application that is executed by a computing device 102A that may be connected to a network 190 (e.g., the Internet). The browser application can open one or more tabs 202, one of which may display the user interface to the marketplace when a user navigates to a webpage identified by a uniform resource locator (URL) 204 that provides content to the browser so that the browser can display the user interface to the marketplace in the tab.

The content provided by the webpage to the user can include a plurality of icons 206A, 206B, 206C, 206D, 206E, 206F, 208A, 208B, 208C, 208D, 208E, 210A, 210B, 210C that represent digital goods that can be downloaded from the webpage by the user for execution by a computing device controlled by the user. Digital goods can include web applications, natively operating applications, and browser extensions that can be downloaded from the marketplace to a client computing device where they can be installed on the computing device for execution on the computing device, either by a browser running on the device or with the aid of a browser in the case of a natively operating application.

Within the user interface 200, the installable web applications can be displayed in a manner that is organized to help a user decide which applications may be useful or relevant to the user. For example, the user interface 200 can include a category 212 of applications 206A, 206B, 206C, 206D, 206E, 206F that have been recently released in the marketplace and which a curator of the marketplace may deem to be especially noteworthy to users. In one implementation, the applications 206A, 206B, 206C, 206D, 206E, 206F shown in the category 212 can be limited to applications that have been released in the marketplace within a recent period of time (e.g. one week, one month, three months, six months). Then, a subset of the applications that have been released into the marketplace within the recent period of time can be selected based on a variety of signals that indicate the noteworthiness of the selected applications to the user, and the selected subset of applications 206A, 206B, 206C, 206D, 206E, 206F can be displayed within the category 212. That is, the applications 206A, 206B, 206C, 206D, 206E, 206F shown in the New and Noteworthy category 212 of the user interface 200 can be a subset of a larger number of applications that also could qualify as being new and noteworthy but which have not been selected for display in the user interface 200. A variety of signals that can be used to rank and select the subset of applications as described in more detail below.

In another example, the user interface 200 can include a category 214 of applications 208A, 208B, 208C, 208D, 208E that have been selected to be featured for display in the user interface 200. The applications 208A, 208B, 208C, 208D, 208E that are selected to be featured in the category 214 can be selected based on criteria evaluated by a curator of the market place. For example, the curator may select the applications 208A, 208B, 208C, 208D, 208E for display in the category 214 from a much larger set of applications based on the curator's opinion of the quality, popularity, or utility of the selected applications.

In another example, the user interface 200 can include a category 216 of applications 210A, 210B, 210C that have been selected for display in the category 216 of the user interface 200 based on a popularity ranking of the selected applications relative to other applications. The popularity ranking can be determined based on reviews of the applications by users who have downloaded and used the applications. For example, the marketplace may request that users rate applications quantitatively using a system of one to five stars, where five stars is the highest rating, and one star is the lowest rating. Then, applications within the marketplace can be ranked based on their user rating. In one implementation, applications with the highest average rating can be ranked highest. In another implementation, applications with the highest number of five-star ratings can be ranked highest. Then, applications 210A, 210B, 210C with the highest rankings can be selected for display in the user interface 200 of the marketplace.

The user interface 200 of the marketplace also can include categories of applications in other subportions of the user interface 200 in which smaller icons are used to represent the applications that are used in categories 212, 214, 216. For example, category 218 can display "Favorite Paid Apps," which can be applications for which a user must pay money before being able to download and install the application on the user's computing device. Applications listed in the Favorite Paid Apps category 218 can be the most frequently downloaded and/or most frequently installed applications for which the user must pay money. In another example, category 220 can display "Staff Picks," which can be applications that are selected by a curator at the marketplace based on the selected applications being deemed especially interesting to users who visit the marketplace in search of applications.

Within the user interface 200, categories 212, 214, 216, 218, 220 can display a subset of applications that are categorized to fall within the category. Because screen space within the user interface is limited, only a subset of the applications that fall within a category may be displayed within the user interface 200. However, by selecting a hyperlink associated with the category, more applications that fall within the category can be displayed to a user. For example, each category 212, 214, 216, 218, 220 is associated with a hyperlink labeled "All," the selection of which may cause more applications that fall within the category to be displayed.

Other parts of the user interface 200 also can be used to organize the digital goods that are available in the marketplace. For example, an "Apps" section 222 can provide a list of hyperlinks, which each can be selected to display applications that belong to a category identified by the hyperlink. For example, selection of the "Education" hyperlink 223 can cause a group of icons that represent applications related to educational topics to be displayed. In another example, an "Extensions" section 224 can provide a list of hyperlinks, which each can be selected to display browser extensions that belong to a category identified by the hyperlink. For example, selection of the "Sports" hyperlink 225 can cause a group of icons that represent browser extensions related to sports topics to be displayed.

In addition to locating digital goods that are already displayed within a category 212, 214, 216, 218, 220 of the user interface 200 that could be displayed as a result of selecting a hyperlink 223, 225, digital goods also can be located as a result of a query for goods that may be of interest to the user. For example, a user may enter query terms into a query box 226 that may receive the query terms and pass the terms onto a search engine that then locates digital goods that match the query terms and that are available in the marketplace. For example, digital goods such as web applications can have a variety of metadata associated with them that are used to index the digital goods, and the query terms can be compared to the metadata associated with the digital goods. Based on the comparison, applications that best match the query terms can be selected from the digital goods available in the marketplace, and the selected goods can be presented to the user in the user interface 200.

The user interface 200 also includes a hyperlink 227 that can be selected so that the user can log into the marketplace. For example, selection of the hyperlink 227 can trigger the display of a prompt to the user to enter a username and password, and successful entry of the username and password may allow the user to log into a personal account associated the marketplace. As explained in more detail below, once the user is logged into the marketplace, digital goods can be selected and presented to the user within the user interface 200, where the selection of the goods can be personalized to the user based on data associated with the user's account.

Figure 3:
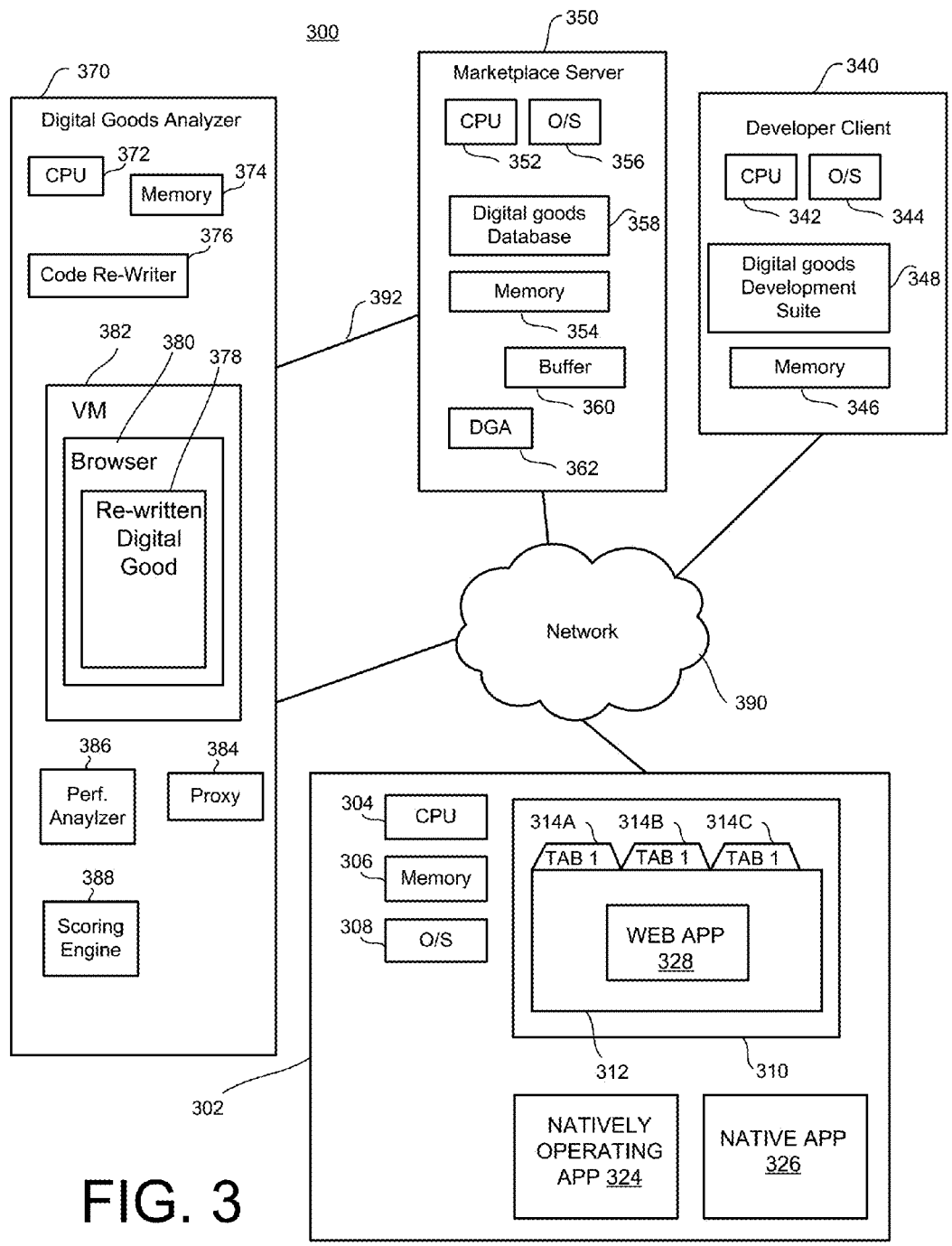
FIG. 3 is a schematic diagram of a system that may provide automatic dynamic vetting of browser extensions and web applications.

FIG. 3 is a schematic diagram of a system 300 that may provide automatic dynamic vetting of browser extensions and web applications. The system 300 can be used to test digital goods (i.e., web applications, natively operating applications, and/or browser extensions) that developers or merchants propose for listing in the marketplace to ensure that the proposed applications meet certain quality standards and/or do not contain malicious or suspicious code before the digital goods are listed in the marketplace for consumers to download and from the marketplace.

The system 300 can include a marketplace server 350, a developer client 340, a digital goods analyzer 330, and a client computing device 302. The marketplace server 350 can be similar, or identical, to marketplace server 150, and can include a processor 352 that can be used to execute an operating system 356. A memory 354 can store a variety of information, including executable instructions that can be executed by the processor 352. The client computing device 302 can be similar or identical to device 102A, and can contain similar elements to those included in device 102A. For example, device 302 can include a processor 304 and configured for executing instructions, a memory 306 configured for storing instructions, an operating system 308. The processor 304, the memory 306, and the operating system 308 can be used in conjunction for executing a web application 328 or browser extension in a web browser 312 that may include tabs 314A, 314B, 316C. Web browser 312 is a type of application 310 that can be executed by a processor 304. In addition, processor 304 can execute a natively operating application 324 or a native application 326.

A developer or merchant can upload a proposed digital good that is proposed for listing in the marketplace from a developer's computing device 340 to the marketplace server 350 and can request that the marketplace operator list the digital good for sale or distribution from the marketplace. The developer's computing device 340 can include, for example, a processor 342, an operating system 344, a memory 346 for storing instructions executable by the processor 342, and the digital goods development suite 348 that can be used to develop one or more digital goods (i.e., a web application, a browser extension, and/or a natively operating application) that can be proposed for inclusion in the marketplace. The proposed digital good can be transmitted to the marketplace server 350 and a digital good package. The package may be in a ZIP file format, which facilitates the transmission of source code files, metadata files, configuration files, a manifest file, resources (such as images, texts, etc.) that are necessary to execute the digital good on client 302. In some implementations, the marketplace server 350 can receive a digital good package in a Java Archive (JA R) format or other data compression and archive file format.

Upon receiving a request and a copy of the proposed digital good, the marketplace server 350 can initiate an automatic vetting process of the proposed digital good. The automatic vetting process can be performed by a digital goods analyzer 362 within the marketplace server 350 before it is offered for sale or distribution to a client device 302. The proposed digital good can be stored in a buffer 360 of the marketplace server 350 before it is vetted and approved for listing in the digital goods database 358 of approved digital goods that are provided to clients of the marketplace. In another implementation, the automatic vetting process can be performed by an analysis server 370 that is associated with the marketplace server 350, either through a connection over a network 390 or through a network (e.g., a local area connection) 392. In the description below, the automatic vetting process is described as being performed by the separate analysis server 370, but it is understood that the automatic vetting process also can be performed within the marketplace server 350.

The analysis server 370 can include one or more memories 374 configured for storing executable code and one or more processors 372 configured for executing the code. In one implementation, the analysis server 370 can automatically dynamically test a digital good that is proposed for listing in the marketplace, for example, for inclusion in the digital goods database 358 of the marketplace server 350, to determine whether the proposed digital good violates one or more predetermined conditions that would trigger either exclusion of the proposed digital good from the marketplace or a mandatory manual review of the proposed digital good before the proposed digital goods could be included in the marketplace. The digital good that is proposed for inclusion in the marketplace can be received (e.g., at the marketplace server 350). When the proposed digital good is received in a package format, a file extractor can extract files from the package. The file extractor can extract the manifest file, which can include information such as the title, version and build data of the digital good, and the location path to source code files that are included in the package. To extract source code files of the digital good, the file extractor can access the manifest file to retrieves a listing of files that include source code. In another implementation, the file extractor can scan file extensions of the files included in the digital good package and identify files with extensions specific to source code files.

Source code of the received digital good can be rewritten by a code rewriter 376 to include code to track behavior of the digital good during execution of the rewritten digital good. The rewritten code of the digital good can be executed by the analysis server 370. In some implementations, the rewritten code 378 of the digital good can be executed by a browser 380 that runs within a virtual machine 382 of the analysis server 370. While the rewritten digital good 378 executes within the browser 380, it can connect to a network 390, such as the Internet, through a proxy 384. While the rewritten digital good 378 executes, its dynamic behavior can be logged and analyzed by a performance analyzer 386.

Based on evaluation of results of executing the rewritten digital good 378, an automatic determination (i.e., without human input or intervention) can be made about whether the proposed digital good would violate one or more predetermined conditions that are relevant to whether the proposed digital good should be automatically listed for sale or free download to users in the marketplace. Then, based on evaluation of results of whether the digital good violates a predetermined condition, an automatic determination (i.e., without human input or intervention) can be made whether to list the proposed digital good for offer in the marketplace, or whether to deny the proposed digital good from the marketplace, or whether to flag the proposed digital good for further manual review before offering it in the marketplace.

Digital goods that utilize scripting language source code (e.g., JavaScript) can receive a variety of inputs that can be used as values for variables in the source code. For example, JavaScript event handlers may execute as a result of user actions such as clicking buttons or submitting forms that are presented to the user when the code is executed. In addition, JavaScript can accept user input, such as, for example, text input by a user as values for variables in the code. JavaScript can also accept uniform resource locators (URLs) as values for variables in the code, and information hosted on other tabs or frames, different from the tab or frame in which the JavaScript code of the digital good executes, can communicate with JavaScript code of the digital good through inter-frame communication abstractions such as URL fragment identifiers and the PostMessage operation of HTML 5. All of these various inputs to the scripting language code can influence the dynamic behavior of the digital good, sometimes in ways that are difficult to foresee. Therefore, the analysis server 370 can be used to evaluate automatically all, or at least a large number of the control paths of the proposed digital good and determine the inputs that influence the control path taken by the digital goods during execution of its code.

To do this, the code rewriter 376 can rewrite source code of the proposed digital good to replace certain inputs with symbolic variables, so that symbolic information is propagated during execution of the rewritten digital goods. Then, whenever an operand of a JavaScript operation is symbolic, the operation can be simulated by creating a formula for the result of the operation in terms of symbolic information used for the operands. When symbolic value is propagated to a node of the control path for the code of the digital good from which multiple branches occur, the performance analyzer 386 can determine the inputs that would cause the code execution to propagate down each branch.

Nodes in the control path can be associated with control words in the source code. For example, control words in a JavaScript code many include "if", "else", "for", "ease", "switch", "default", "break", etc. Control words are specific to a particular programming language used to for the source code of a digital good. Thus, while the rewritten source code is executed, the performance analyzer 386 can monitor the propagation of symbolic information to determine which symbols, corresponding to variables in the code of the proposed digital good, influence the control paths taken by the executed code. This symbolic execution of the rewritten code can be used to fully execute all possible control code paths in the source code of the proposed digital good.

For example, in the source code statement:

if var v=(x>1) f(a): f(b), the word "if" can be identified as a control word by performance analyzer 386, and the performance analyzer can determine that when the first expression (x>1) is true, variable "v" is set to the second expression (v=f(a)), but if the first expression is false, "v" is set to the third expression (v=f(b)). Thus, for each control statement, or node in the control path, the performance analyzer 386 analyzes the dynamic behavior of the digital good. The source code statement the above can be presented graphically as in the diagram below, where the "x>1" block represents a node of the control graph and the "v=f(a)" and "v=f(b)" blocks represent two branches of the graph.

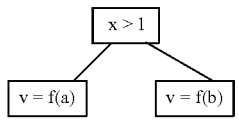

By rewriting the proposed digital good such that symbolic information is propagated during execution of the rewritten digital good, a standard JavaScript interpreter can be used to interpret the rewritten digital good. In other words, a JavaScript interpreter that is used to interpret the proposed digital good can also be used to interpret the code of the rewritten digital good and a special interpreter need not be used.

The symbolic execution techniques described above can be used to automatically determine control paths in the code of a proposed digital good. Then, certain of the determined control paths can be executed within the virtual machine 382, and the results of that execution can be used to determine whether the proposed digital good violates one or more predetermined conditions that would prevent the proposed good from being listed in the marketplace or that would require the proposed good to be manually vetted before it could be listed in the marketplace or that would require the proposed digital good to be listed in the marketplace with warnings for caveats. In some implementations, control paths that include operations may be flagged as potentially suspicious, either because of what the operation does or because of the inputs that the operation uses to perform its function. Such control paths that include potentially suspicious operations can be executed within the virtual machine 382 to observe the dynamic behaviour of the proposed digital good. During execution of the rewritten digital good within the virtual machine 382 the browser 380 can connect to the network 390 through a proxy 384, so that known and validated content can be provided to the digital good 378 during its execution. While the digital good 378 executes, the performance analyser 386 can monitor the dynamic behaviour of the proposed digital good, including the behaviour of the potentially suspicious operations. Monitoring the dynamic behaviour of the proposed digital good can include logging network requests made by the digital good, logging writes made to local storage, recording dialog boxes that appear as a result of the execution of the code, etc.

Because the symbolic execution techniques can be used to determine the inputs that determine which particular control paths are taken during execution of the digital good, the inputs that cause anomalous or undesirable behaviors in the execution of the proposed digital good can be quickly and automatically identified. For example, the performance analyzer 386 may list a digital good having a code block that executes only when a URL input is equal to a particular value as a predetermined condition to look for during dynamic execution of the rewritten digital good. Such a digital good may operate benignly in nearly all cases, except when a URL input is equal to a particular value (e.g., "www.facebook.com"), and then in the anomalous case the digital good may perform undesirable actions (e.g., sending spam, sending unwanted ads, or automatically downloading a new digital good). In another example, the performance analyser 386 may list a digital good having a code block that prompts a user to download and install a program binary file as a predetermined condition to look for during dynamic execution of the rewritten digital good. The performance analyzer 386 may automatically detect digital goods that include such anomalous behavior through the symbolic execution techniques described herein.

The automatic detection of such anomalous behavior(s) of a proposed digital good conservative signals for use by a scoring engine 388 that determines the outcome of a request to list a proposed digital good in the marketplace. The scoring engine 388 can receive as inputs signals of various anomalous behaviors of a proposed digital good, and can process the signals to determine whether the proposed digital goods should be automatically listed in the marketplace or whether other actions should be taken. For example, if no anomalous behaviour of a proposed digital good is detected by the performance analyser 386, the scoring engine 388 may generate a score for the proposed digital good that would allow the digital good to be automatically listed in the marketplace. In another example, if anomalous, but benign, behaviour of a proposed digital good (e.g., hyperlinks within a web application digital good are presented in red, rather than blue, font), the scoring engine 388 may generate a score for the proposed digital good that would allow the digital good to be automatically listed in the marketplace. In another example, if anomalous behaviour that is known to be deliberately malicious is detected for a proposed digital good, the proposed digital good can be automatically prohibited from listing in the marketplace or taken down from the marketplace (e.g., if the digital good had already been listed in the marketplace and then later was tested by the analysis server 370). In another example, if anomalous behaviour is detected, the result of which is potentially dangerous or unknown, the proposed digital good can be flagged for manual review before the digital good can be allowed to be listed in the marketplace. In still another example if certain known anomalous behaviour is detected for a proposed digital good, the proposed digital good can be listed in the marketplace along with a caveat or warning about the anomalous behaviour. For example, a proposed digital good might provide a service that would be useful or desirable to advanced user but that would be confusing and/or useless for a beginner user. For example, in such a case, as shown in FIG. 2, a supplementary icon or badge 232 can be associated and presented with an icon 208D for the digital good that is presented in a user interface to the marketplace, when the digital good is determined to exhibit particular anomalous behaviour that does not rise to the level of prohibiting the digital good from listing in the marketplace but which parrots a warning to users about the behaviour of the digital good.

Rewriting of a proposed digital good also can be used to automatically detect leaks of sensitive information from a digital good 328 executing on a computing device 302 across a network 392 to a third-party site. Rewriting of a proposed digital good in this manner can be known as "taint tracking" in which the flow of information within, and out of, a digital good can be monitored automatically. For example, a "taint" property can be added by code rewriter 376 to tainted variables (e.g., variables that received and/or store personal and sensitive information of a user) that are identified in the code of the proposed digital goods. An example tainted variable is a variable that receives the results of a function such as "GetBrowserBookmarks( )" or "GetBrowserCookies( )". Other examples of tainted variables include those variables that receive or store personal or sensitive information of the user such as, for example, information about a user's browsing history a user's browser bookmarks, a user's cookies, HTML forms, user preferences, saved passwords, a user's keyboard or mouse movements, HTML data, URLs associated with a user, etc. Tainted variables may be copied, replicated, or sent to another variable. For example, in the source code below var x="GetBrowserBookmarks( )";
 // some source code
 var a=GetData( );
 Var y=x+a;

variable "x" is a tainted variable because it receives a listing of the user's bookmarks and the browser that executes the code. Variable "y" is also a tainted variable because it is set, at least in part, to the data in variable "x."

When the scripting language of the proposed digital good is JavaScript, primitive datatypes can be rewritten as objects and a "taint" property can be added to each object. For example, the "document.cookie", which represents a primitive data type can be rewritten as an object, so that the result of the operation read(document.cookie) returns an object rather than a primitive string, and the object can contain extra information that identifies the result of the operation as a tainted variable.

Performance analyzer 386 also can determine operations in the source code that act as sinks for tainted sources and transmit personal or sensitive information of a user. For example, the operation XMLHttpRequest( ) can act as a sink of personal or sensitive information. The cross-origin XML HttpRequest permission may be used to enable a web application or an extension application to request access to remote servers outside of its origin.

Rewritten code of a proposed digital good can be executed, and the taint property can be propagated through operations of the code as the code executes. The performance analyzer 386 can monitor when the tainted source is passed through a sink such that information is leaked from the digital good across a network. Based on evaluation of results of executing the rewritten code of the digital good the performance analyser 386 can make an automatic determination of whether the digital good violates one or more predetermined conditions (e.g., whether personal user information associated with a tainted variable is leaked from the digital good across a network). Then, based on the determination of whether the digital good violates one or more of the predetermined conditions the scoring engine 388 can score the proposed digital good. The score then can be used to automatically determine whether to automatically list the digital good in the marketplace, whether to automatically prohibit the digital good from listing in the marketplace or to take down the digital good from the marketplace, whether to flag the digital good for manual review before the digital good can be allowed to be listed in the marketplace whether to list the digital good in the marketplace along with a caveat or warning about the anomalous behaviour.

Because of the automated nature of the digital good vetting process, which analyzes the dynamic behaviour of the proposed digital goods, if the proposed digital goods do not include code that has been predetermined to be risky, then the proposed digital goods can be listed for distribution in the marketplace very quickly after the developer merchant requests that the application be listed. For example, the proposed digital goods can be listed in the marketplace less than 10 minutes, less than 5 minutes, less than 3 minutes, or less than 1 minute after the request to list a digital good has been received at the marketplace server 150. The speed with which a digital good can be listed for distribution to consumers after a developer merchant has requested that digital goods be listed can provide for a satisfying experience for merchants and developers.

Figure 4:
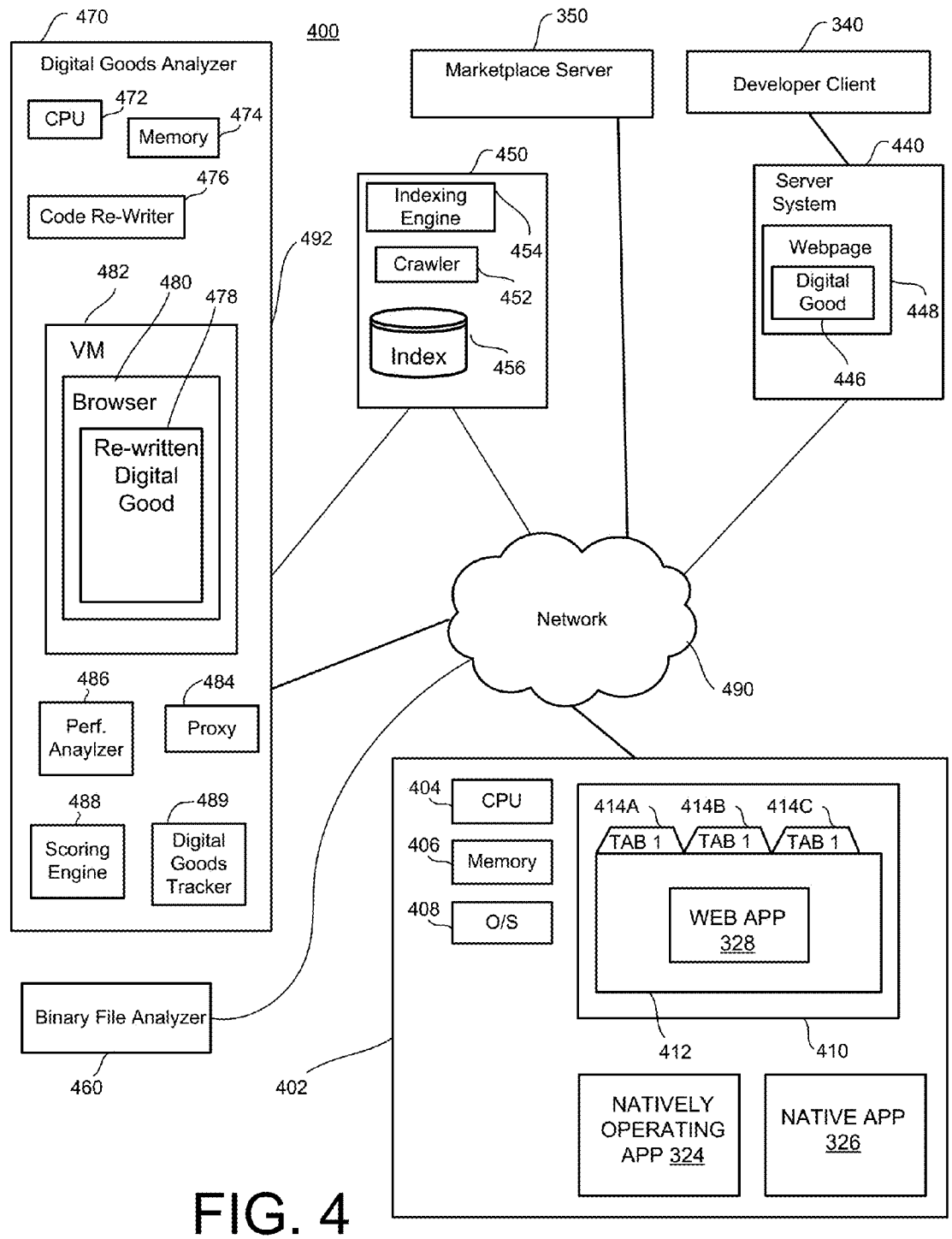
FIG. 4 is a schematic diagram of a system that may provide automatic dynamic vetting of browser extensions and web applications.

FIG. 4 is a schematic diagram of a system 400 that may provide automatic dynamic vetting of browser extensions and web applications that are provided, or offered, to a client computing device operated by a user from locations other than the marketplace server 350. The system 400 can be used to test digital goods (i.e., web applications, natively operating applications, and/or browser extensions) that developers or merchants offer to users to check whether the digital goods meet certain quality standards and/or do not contain malicious or suspicious code.

The system 400 can include a marketplace server 350, a developer client 340, a server system 440, an indexing system 450, a digital goods analyzer 470, and a client computing device 402. The marketplace server 350 can be similar, or identical, to marketplace server 350 shown in FIG. 3. The client computing device 402 can be similar or identical to device 102A or device 302, and can contain similar elements to those included in device 102A or device 302. For example, device 402 can include a processor 404 configured for executing instructions, a memory 406 configured for storing instructions, and an operating system 408. The processor 404, the memory 406, and the operating system 408 can be used in conjunction for executing a web application 428 or browser extension in a web browser 412 that may include tabs 414A, 414B, 416C. Web browser 412 is a type of application 410 that can be executed by a processor 404. In addition, processor 404 can execute a natively operating application 424 or a native application 426.

A developer or merchant can upload a digital good from a developer's computing device 340 to the server system 440, which can be unaffiliated with, and uncontrolled by, the marketplace server. The digital good can be offered for download from the server system 440 over the network 490 to the client device 402 for installation on, and execution by, the client device 402. The server system can host and serve a webpage 448 that can include the digital good supplied by the developer client 340 as part of its content. Thus, the client computing device 402 can navigate to the webpage 448 and download the digital good from the webpage 448 without the protections offered by the marketplace server 350 and the digital goods marketplace. Although the developer client 340 and the server system 440 are shown as different entities in FIG. 4, this is for illustration purposes only, and in some implementations the server system 440 and the developer client 340 can be configured and operated as a single unit under unified control.

As explained above, the digital good 446 can be transmitted to the server system 440 as a digital good package. The package may be in a ZIP file format, which facilitates the transmission of source code files, metadata files, configuration files, a manifest file, resources (such as images, texts, etc.) that are necessary to execute the digital good on client 402. In some implementations, the server system 440 can receive a digital good package in a Java Archive (JAR) format or other data compression and archive file format. The server system can offer the digital good 446 for downloading in the compressed format or in an uncompressed format.

The digital good 446 can be identified by, or to, the digital goods analyzer 470 in a number of ways. For example, an indexing system 450 that crawls and indexes digital content accessible over the network 490 can identify the digital good. For example, the indexing system 450 can include a web crawler 452 that navigates to a large number of webpages and provides the content of the webpages to an indexing engine 454 that creates an index 456 of the crawled webpages. The indexing system can include functionality in the crawler 452, in the indexing engine 454, or in one or more different components that analyzes the content of a crawled webpage and determines whether the crawled content appears to include a digital good (i.e., a web application or a web extension). For example, the indexing system 450 can analyze the content of the crawled webpage to recognize a manifest file of a digital good within the content of the website, and the existence of the manifest file can indicate the presence of the digital good in the webpage. If the indexing system 450 determines that the code appears to include content related to a digital good, the code that appears to be related to a digital good can be passed to the digital goods analyzer 470 for analysis and vetting.

In another implementation, a binary file analyzer can be used to analyze and vet program binary files that are identified on webpages accessible through the network 490. For example, the binary file analyzer 460 can receive indications from the indexing system 450 that a content of a webpage 448 includes a program binary file, and the program binary can be passed to the binary file analyzer 460 for vetting, so that user's can be warned if the binary file poses a threat to the user if it is downloaded and executed on the user's client device 402. The binary file analyzer 460, when analyzing the binary file, can determine whether code of the binary file appears to include content related to a digital good. If the analyzer 460 determines that the code appears to include content related to a digital good, the code that appears to be related to a digital good can be passed to the digital goods analyzer 470 for analysis and vetting.

In another implementation, digital goods being offered from third-party locations (i.e., not from the marketplace server 350) can be identified based on a number of time or a rate at which they are downloaded from a webpage 448. For example, when a digital good is downloaded and/or installed on within a browser 412 of a client computing device 402, the client computing device 402 can send a message to a digital goods tracker 489, where the message reports a unique identification code of the downloaded digital good and a URL or the website from which the digital good was downloaded. When the number of clients that have downloaded the digital good having a particular unique identification code exceeds a threshold value, or when the number of frequency with which a digital good exceeds a threshold rate, the digital goods tracker can signal the web crawler 452 to crawl the content of the website from which the digital good was downloaded and to provide the crawled content to the digital goods analyzer 470 for analysis and vetting.

As described above with respect to FIG. 3, upon the identification of digital good 446 that is offered by a third-party server system 440, an automatic vetting process of the digital good can be initiated. The automatic vetting process can be performed by an analysis server 470 that includes one or more memories 474 configured for storing executable code and one or more processors 472 configured for executing the code. In one implementation, the analysis server 470 can automatically dynamically test a digital good that is offered by a third-party server system to determine whether the digital good violates one or more predetermined conditions that would trigger discouraging downloading the digital good from the web to the client computing device or executing the digital good by the client computing device. The digital good that is proposed for inclusion in the marketplace can be received (e.g., at the digital goods analyzer 470). When the proposed digital good is received in a package format, a file extractor can extract files from the package. The file extractor can extract the manifest file, which can include information such as the title, version and build data of the digital good, and the location path to source code files that are included in the package. To extract source code files of the digital good, the file extractor can access the manifest file to retrieve a listing of files that include source code. In another implementation, the file extractor can scan file extensions of the files included in the digital good package and identify files with extensions specific to source code files.

Source code of the received digital good can be rewritten by a code rewriter 476 to include code to track behavior of the digital good during execution of the rewritten digital good. The rewritten code of the digital good can be executed by the analysis server 470. In some implementations, the rewritten code 478 of the digital good can be executed by a browser 480 that runs within a virtual machine 482 of the analysis server 470. While the rewritten digital good 478 executes within the browser 480, it can connect to a network 490, such as the Internet, through a proxy 484. While the rewritten digital good 478 executes, its dynamic behavior can be logged and analyzed by a performance analyzer 486.

Based on evaluation of results of executing the rewritten digital good 478, an automatic determination (i.e., without human input or intervention) can be made about whether the digital good offered by the third-party server system would violate one or more predetermined conditions that are relevant to whether the digital good offered by the third-party server system should be automatically listed for sale or free download to users in the marketplace. Then, based on evaluation of results of whether the digital good violates a predetermined condition, an automatic determination (i.e., without human input or intervention) can be made whether to discourage downloading the digital good from the web to the client computing device or execution of the digital good by the client computing device.

As described above, digital goods that utilize scripting language source code (e.g., JavaScript) can receive a variety of inputs that can be used as values for variables in the source code. For example, JavaScript event handlers may execute as a result of user actions such as clicking buttons or submitting forms that are presented to the user when the code is executed. In addition, JavaScript can accept user input, such as, for example, text input by a user as values for variables in the code. JavaScript can also accept uniform resource locators (URLs) as values for variables in the code, and information hosted on other tabs or frames, different from the tab or frame in which the JavaScript code of the digital good executes, can communicate with JavaScript code of the digital good through inter-frame communication abstractions such as URL fragment identifiers and the PostMessage operation of HTML 5. All of these various inputs to the scripting language code can influence the dynamic behavior of the digital good, sometimes in ways that are difficult to foresee. Therefore, the analysis server 470 can be used to evaluate automatically all, or at least a large number of the control paths of the digital good offered by the third-party server system and determine the inputs that influence the control path taken by the digital goods during execution of its code.

To do this, the code rewriter 476 can rewrite source code of the digital good offered by the third-party server system to replace certain inputs with symbolic variables, so that symbolic information is propagated during execution of the rewritten digital goods. Then, whenever an operand of a JavaScript operation is symbolic, the operation can be simulated by creating a formula for the result of the operation in terms of symbolic information used for the operands. When symbolic value is propagated to a node of the control path for the code of the digital good from which multiple branches occur, the performance analyzer 486 can determine the inputs that would cause the code execution to propagate down each branch.

Nodes in the control path can be associated with control words in the source code. For example, control words in a JavaScript code many include "if", "else", "for", "ease", "switch", "default", "break", etc. Control words are specific to a particular programming language used to for the source code of a digital good. Thus, while the rewritten source code is executed, the performance analyzer 486 can monitor the propagation of symbolic information to determine which symbols, corresponding to variables in the code of the digital good offered by the third-party server system, influence the control paths taken by the executed code. This symbolic execution of the rewritten code can be used to fully execute all possible control code paths in the source code of the digital good offered by the third-party server system.

For example, in the source code statement:
if var v=(x>1) f(a): f(b),
the word "if" can be identified as a control word by performance analyzer 486, and the performance analyzer can determine that when the first expression (x>1) is true, variable "v" is set to the second expression (v=f(a)), but if the first expression is false, "v" is set to the third expression (v=f(b)). Thus, for each control statement, or node in the control path, the performance analyzer 486 analyzes the dynamic behavior of the digital good. The source code statement above can be presented graphically as in the diagram below, where the "x>1" block represents a node of the control graph and the "v=f(a)" and "v=f(b)" blocks represent two branches of the graph.

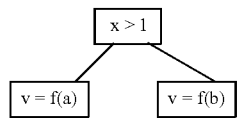

By rewriting the digital good offered by the third-party server system such that symbolic information is propagated during execution of the rewritten digital good, a standard JavaScript interpreter can be used to interpret the rewritten digital good. In other words, a JavaScript interpreter that is used to interpret the digital good offered by the third-party server system can also be used to interpret the code of the rewritten digital good and a special interpreter need not be used.

The symbolic execution techniques described above can be used to automatically determine control paths in the code of a digital good offered by the third-party server system. Then, certain of the determined control paths can be executed within the virtual machine 482, and the results of that execution can be used to determine whether the digital good offered by the third-party server system violates one or more predetermined conditions that would that would trigger discouragement of the downloading and or executing of the digital good that is offered by the third-party server system. In some implementations, control paths that include operations may be flagged as potentially suspicious, either because of what the operation does or because of the inputs that the operation uses to perform its function. Such control paths that include potentially suspicious operations can be executed within the virtual machine 482 to observe the dynamic behaviour of the digital good offered by the third-party server system. During execution of the rewritten digital good within the virtual machine 482 the browser 480 can connect to the network 490 through a proxy 484, so that known and validated content can be provided to the digital good 478 during its execution. While the digital good 478 executes, the performance analyser 486 can monitor the dynamic behaviour of the digital good offered by the third-party server system, including the behaviour of the potentially suspicious operations. Monitoring the dynamic behaviour of the digital good offered by the third-party server system can include logging network requests made by the digital good, logging writes made to local storage, recording dialog boxes that appear as a result of the execution of the code, etc.

Because the symbolic execution techniques can be used to determine the inputs that determine which particular control paths are taken during execution of the digital good, the inputs that cause anomalous or undesirable behaviors in the execution of the digital good offered by the third-party server system can be quickly and automatically identified. For example, the performance analyzer 486 may list a digital good having a code block that executes only when a URL input is equal to a particular value as a predetermined condition to look for during dynamic execution of the rewritten digital good. Such a digital good may operate benignly in nearly all cases, except when a URL input is equal to a particular value (e.g., "www.facebook.com"), and then in the anomalous case the digital good may perform undesirable actions (e.g., sending spam, sending unwanted ads, or automatically downloading a new digital good). In another example, the performance analyser 486 may list a digital good having a code block that prompts a user to download and install a program binary file as a predetermined condition to look for during dynamic execution of the rewritten digital good. The performance analyzer 486 may automatically detect digital goods that include such anomalous behavior through the symbolic execution techniques described herein.

The automatic detection of such anomalous behavior(s) of a digital good offered by the third-party server system provides conservative signals for use by a scoring engine 488 that determines whether to discourage downloading and/or execution of the digital good. The scoring engine 488 can receive as inputs signals of various anomalous behaviors of a digital good offered by the third-party server system, and can process the signals to determine whether the digital good offered by the third-party server system should be discouraged from being downloaded to, or executed by, the client computing device 402. For example, if no anomalous behaviour of a digital good offered by the third-party server system is detected by the performance analyser 486, the scoring engine 488 may generate a score for the digital good offered by the third-party server system that would take no action with respect to the digital good. In another example, if anomalous, but benign, behaviour of a digital good offered by the third-party server system (e.g., hyperlinks within a web application digital good are presented in red, rather than blue, font), the scoring engine 488 may generate a score for the digital good offered by the third-party server system that take no action against the digital good. In another example, if anomalous behaviour that is known to be deliberately malicious is detected for a digital good offered by the third-party server system, the digital good offered by the third-party server system can be automatically discouraged from being downloaded to, or executed by, the client computing device 402. In another example, if anomalous behaviour is detected, the result of which is potentially dangerous or unknown, the digital good offered by the third-party server system can be flagged for manual review before the digital good will be discouraged. In still another example if certain known anomalous behaviour is detected for a digital good offered by the third-party server system, a warning to the user of the client computer device 402 about the anomalous behaviour of the digital good can be provided when the user seeks to download the digital good from the webpage 446. For example, a digital good offered by the third-party server system might provide a service that would be useful or desirable to advanced user but that would be confusing and/or useless for a beginner user.

Rewriting of a digital good offered by the third-party server system also can be used to automatically detect leaks of sensitive information from a digital good 428 executing on a computing device 402 across a network 492 to a third-party site. Rewriting of a digital good offered by the third-party server system in this manner can be known as "taint tracking" in which the flow of information within, and out of, a digital good can be monitored automatically. For example, a "taint" property can be added by code rewriter 476 to tainted variables (e.g., variables that received and/or store personal and sensitive information of a user) that are identified in the code of the digital good offered by the third-party server systems. An example tainted variable is a variable that receives the results of a function such as "GetBrowserBookmarks( )" or "GetBrowserCookies( )". Other examples of tainted variables include those variables that receive or store personal or sensitive information of the user such as, for example, information about a user's browsing history a user's browser bookmarks, a user's cookies, HTML forms, user preferences, saved passwords, a user's keyboard or mouse movements, HTML data, URLs associated with a user, etc. Tainted variables may be copied, replicated, or sent to another variable. For example, in the source code below var x="GetBrowserBookmarks( )";
// some source code
var a=GetData( );
Var y=x+a;

variable "x" is a tainted variable because it receives a listing of the user's bookmarks and the browser that executes the code. Variable "y" is also a tainted variable because it is set, at least in part, to the data in variable "x."

When the scripting language of the digital good offered by the third-party server system is JavaScript, primitive datatypes can be rewritten as objects and a "taint" property can be added to each object. For example, the "document-.cookie", which represents a primitive data type can be rewritten as an object, so that the result of the operation read (document.cookie) returns an object rather than a primitive string, and the object can contain extra information that identifies the result of the operation as a tainted variable.

Performance analyzer 486 also can determine operations in the source code that act as sinks for tainted sources and transmit personal or sensitive information of a user. For example, the operation XMLHttpRequest( ) can act as a sink of personal or sensitive information. The cross-origin XML HttpRequest permission may be used to enable a web application or an extension application to request access to remote servers outside of its origin.

Rewritten code of a digital good offered by the third-party server system can be executed, and the taint property can be propagated through operations of the code as the code executes. The performance analyzer 486 can monitor when the tainted source is passed through a sink such that information is leaked from the digital good across a network. Based on evaluation of results of executing the rewriting code of the digital good the performance analyser 486 can make an automatic determination of whether the digital good violates one or more predetermined conditions (e.g., whether personal user information associated with a tainted variable is leaked from the digital good across a network). Then, based on the determination of whether the digital good violates one or more of the predetermined conditions the scoring engine 488 can score the digital good offered by the third-party server system. The score then can be used to automatically determine whether to whether to discourage downloading the digital good to, or execution of the digital good by, the client computing device 402.

Discouraging the downloading of the digital good 446 from the server system 440 to the client computing device or discouraging execution of the digital good by the client computing device can be implemented in a variety of different ways. For example, in one implementation, the digital goods analyser 470 can maintain (e.g., in memory 474) a blacklist of digital goods that have been determined to violate one or more of the predetermined conditions. In other implementations, the blacklist can be maintained by another entity. The blacklist can be downloaded periodically downloading to client computing devices, including the client computing device 402, and the client computing devices that receive the blacklist and uninstall and delete, or to otherwise disable from execution by the browser 412, any digital good present on the blacklist that had been previously downloaded to the client computing device.

In another implementation, when a user navigates to a webpage 448 that offers the digital good 446 for downloading, the user may begin a downloading and installation process of the digital good. Beginning the downloading and installation process can trigger the automatic sending of a message from the client computing device 402 to the digital goods analyzer. However, during the process, if it has been determined that the digital good 446 violates one or more predetermined conditions, before the digital good is downloaded to the client computing device 402 or before the digital good is installed on the device, a warning can be sent to the client device 402 to caution the user of the device about the risks of downloading and installing the digital good. In some implementations, the warning can be sent from the digital goods analyzer to the client computing device.

Figure 5:
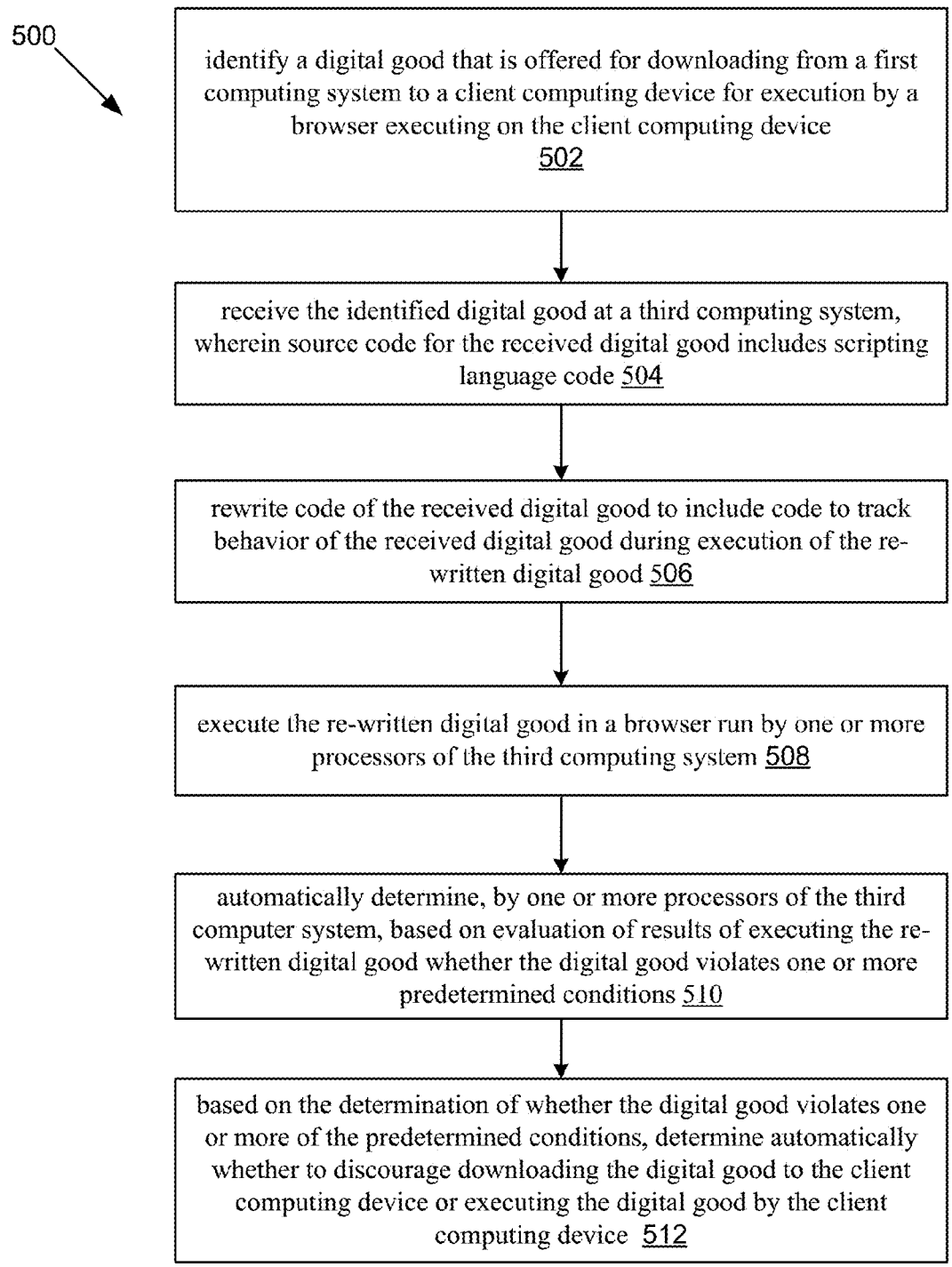
FIG. 5 is a flowchart of a process that implements techniques described herein.

FIG. 5 is a flowchart of a process 500 that implements techniques described herein. The process 500 includes identifying a digital good that is offered for downloading from a first computing system to a client computing device for execution by a browser executing on the client computing device (502), and receiving the identified digital good at a third computing system, wherein source code for the received digital good includes scripting language code (504). The source code of the received digital good is re-written to include tracking code to track behavior of the received digital good during execution of the re-written digital good (506), and the re-written digital good is executed in a browser run by one or more processors of the third computing system (508). One or more processors of the third computer system automatically determine, based on evaluation of results of executing the re-written digital good whether the digital good violates one or more predetermined conditions (510). Based on the determination of whether the digital good violates one or more of the predetermined conditions, it is automatically determined whether to discourage downloading the digital good to the client computing device or executing the digital good by the client computing device (512).

Figure 6:
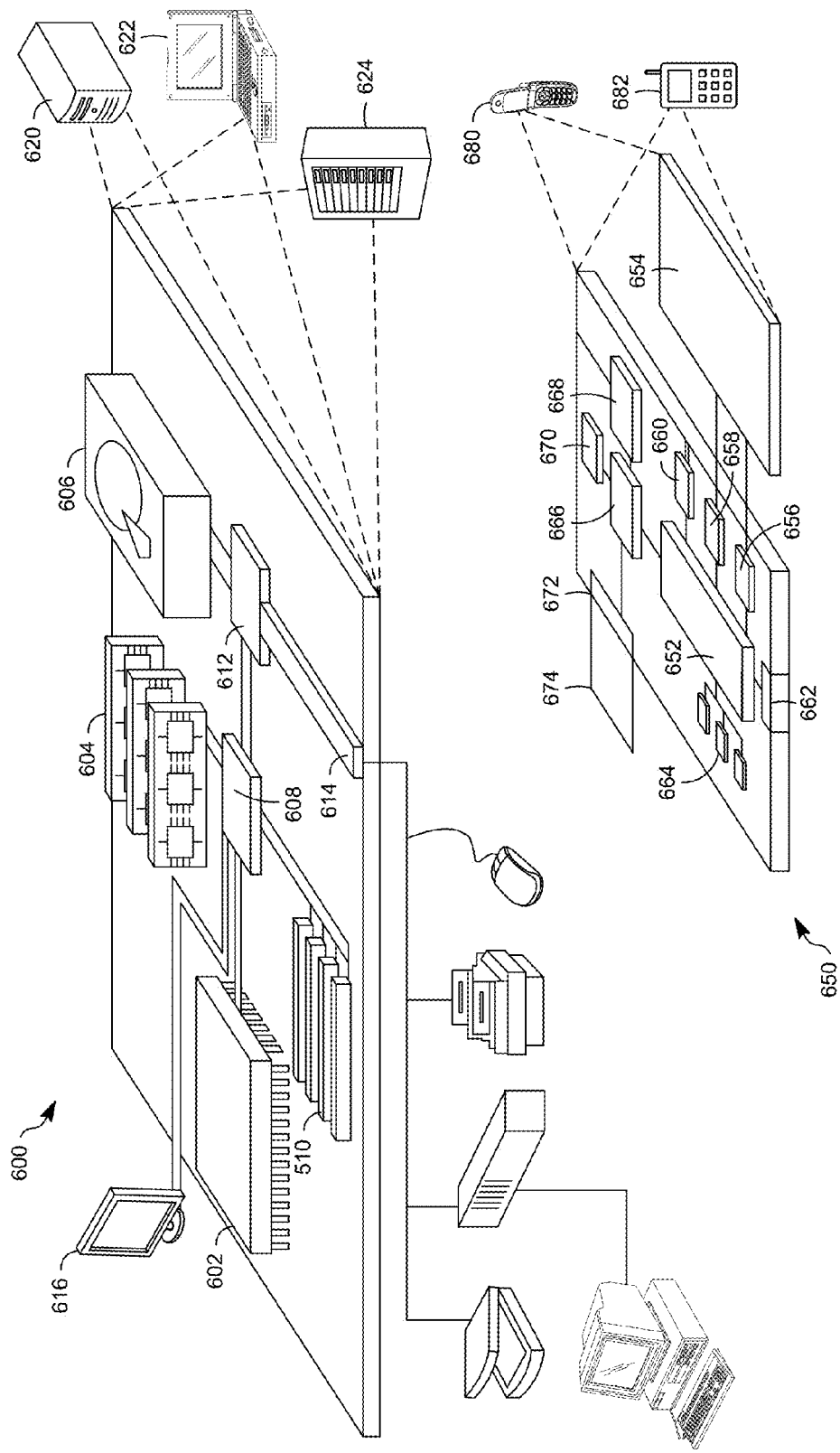
FIG. 6 is a schematic diagram of an exemplary computer systems that may provide automatic dynamic vetting of browser extensions and web applications.

FIG. 6 shows an example of a generic computing device 600 and a generic mobile computing device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   identifying a digital good that is offered for downloading from a first computing system to a client computing device for execution by a browser executing on the client computing device, wherein identifying the digital good includes:
   receiving an indication from each of a number of client devices that a digital good having a unique identification code has been downloaded from a webpage to the client device, wherein the number exceeds a threshold number; and
   identifying the digital good on the webpage;
   receiving the identified digital good at a third computing system, wherein source code for the received digital good includes scripting language code;
   re-writing the source code of the received digital good to include tracking code to track behavior of the received digital good during execution of the re-written digital good;
   executing the re-written digital good in a browser run by one or more processors of the third computing system;
   automatically determining, by one or more processors of the third computer system, based on evaluation of results of executing the re-written digital good whether the digital good violates one or more predetermined conditions; and
   based on the determination of whether the digital good violates one or more of the predetermined conditions, automatically determining whether to discourage downloading the digital good to the client computing device or executing the digital good by the client computing device.

2. The method of claim 1, wherein the scripting language code includes JavaScript code.

3. The method of claim 1, wherein the digital good includes a web application.

4. The method of claim 1, wherein the digital good includes a browser extension.

5. The method of claim 1, wherein identifying the digital good includes:
   crawling content of a webpage accessible to the client computing device through a network; and
   identifying the digital good as part of the content of the webpage.

6. The method of claim 1, wherein identifying the digital good includes:
   crawling content of a webpage accessible to the client computing device through a network;
   identifying a program binary file as part of the content of the webpage; and
   identifying the digital good as part of the content of the program binary file.

7. The method of claim 1, wherein discouraging downloading the digital good to the client computing device or executing the digital good by the client computing device includes:
   downloading to the client computing device a blacklist that includes the digital good, wherein the blacklist instructs the client computing device to disable the digital good from execution by the browser.

8. The method of claim 1, wherein discouraging downloading the digital good to the client computing device or executing the digital good by the client computing device includes:
   receiving an indication from the client computing device that the digital good is proposed from downloading to, or execution by, the client computing device; and
   sending a warning to the client computing device based on the determination of whether the digital good violates one or more of the predetermined conditions.

9. The method of claim 1, wherein re-writing the code of the received digital good includes re-writing the code such that symbolic information is propagated during execution of the re-written digital good so that particular inputs to the code that exercise particular control paths in the code are identified.

10. The method of claim 9, wherein executing the re-written digital good includes interpreting code of the re-written digital good with a scripting language interpreter that is also used to interpret the received digital good during execution of the received digital good.

11. The method of claim 9, wherein an identified input to the code that exercises a particular control path includes a uniform resource locator.

12. The method of claim 9, wherein an identified input to the code that exercises a particular control path includes input received from a user of the digital good.

13. The method of claim 1, further comprising:
   identifying a tainted variable in the code and,
   wherein re-writing the code of the received digital good includes re-writing the code to include information to track a flow of the tainted variable during execution of the re-written code.

14. The method of claim 13, further comprising identifying a code operation of the re-written digital good that is associated with the tainted variable and that leaks information associated with the tainted variable from a client computing device running the digital good across a network to a second computing device.

15. The method of claim 13, wherein automatically determining, by one or more processors of the computer system, based on evaluation of results of executing the re-written digital good whether the digital good violates one or more predetermined conditions includes determining whether personal user information associated with the tainted variable is leaked from a client computing device running the digital good across a network to a second computing device.

16. An apparatus comprising:
   one or more memory devices arranged and configured to store executable code; and
   one or more processors operably coupled to the one or more memory devices, the processors being arranged and configured to execute the code such that the apparatus performs the actions of:
      identifying a digital good that is offered for downloading from a first computing system to a client computing device for execution by a browser executing on the client computing device, wherein identifying the digital good includes:
         receiving an indication from each of a number of client devices that a digital good having a unique identification code has been downloaded from a webpage to the client device, wherein the number exceeds a threshold number; and
         identifying the digital good on the webpage;
      receiving the identified digital good at a third computing system, wherein source code for the received digital good includes scripting language code;
      re-writing the source code of the received digital good to include tracking code to track behavior of the received digital good during execution of the re-written digital good;
      executing the re-written digital good in a browser run by one or more processors of the third computing system;
      automatically determining, by one or more processors of the third computer system, based on evaluation of results of executing the re-written digital good whether the digital good violates one or more predetermined conditions; and
      based on the determination of whether the digital good violates one or more of the predetermined conditions, automatically determining whether to discourage downloading the digital good to the client computing device or executing the digital good by the client computing device.

17. The apparatus of claim 16, wherein identifying the digital good includes:
   crawling content of a webpage accessible to the client computing device through a network; and
   identifying the digital good as part of the content of the webpage.

18. The apparatus of claim 16, wherein identifying the digital good includes:
   crawling content of a webpage accessible to the client computing device through a network;
   identifying a program binary file as part of the content of the webpage; and
   identifying the digital good as part of the content of the program binary file.

19. The apparatus of claim 16, wherein discouraging downloading the digital good to the client computing device or executing the digital good by the client computing device includes:
   downloading to the client computing device a blacklist that includes the digital good, wherein the blacklist instructs the client computing device to disable the digital good from execution by the browser.

20. The apparatus of claim 16, wherein discouraging downloading the digital good to the client computing device or executing the digital good by the client computing device includes:
   receiving an indication from the client computing device that the digital good is proposed from downloading to, or execution by, the client computing device; and
   sending a warning to the client computing device based on the determination of whether the digital good violates one or more of the predetermined conditions.

21. The apparatus of claim 16, wherein the processors are further arranged and configured to execute the code such that the apparatus performs the actions of:
   identifying a tainted variable in the code and,
   wherein re-writing the code of the received digital good includes re-writing the code to include information to track a flow of the tainted variable during execution of the re-written code.

22. The apparatus of claim 21, wherein the processors are further arranged and configured to execute the code such that the apparatus performs the actions of: identifying a code operation of the re-written digital good that is associated with the tainted variable and that leaks information associated with the tainted variable from a client computing device running the digital good across a network to a second computing device.

23. The apparatus of claim 21, wherein automatically determining, by one or more processors of the computer system, based on evaluation of results of executing the re-written digital good whether the digital good violates one or more predetermined conditions includes determining whether personal user information associated with the tainted variable is leaked from a client computing device running the digital good across a network to a second computing device.

* * * * *